United States Patent [19]
Green et al.

[11] Patent Number: 5,642,270
[45] Date of Patent: Jun. 24, 1997

[54] BATTERY POWERED ELECTRIC VEHICLE AND ELECTRICAL SUPPLY SYSTEM

[75] Inventors: Ross Martin Green; Michael John Kellaway, both of Cambridge, United Kingdom

[73] Assignee: Wavedriver Limited, Royston, United Kingdom

[21] Appl. No.: 182,190

[22] PCT Filed: Aug. 3, 1992

[86] PCT No.: PCT/GB92/01435

§ 371 Date: Jan. 28, 1994

§ 102(e) Date: Jan. 28, 1994

[87] PCT Pub. No.: WO93/02887

PCT Pub. Date: Feb. 18, 1993

[30] Foreign Application Priority Data

Aug. 1, 1991 [GB] United Kingdom ............... 9116659
Mar. 27, 1992 [GB] United Kingdom ............... 9206698

[51] Int. Cl.$^6$ ............................................... H02P 5/40
[52] U.S. Cl. ...................................................... 363/21
[58] Field of Search .......................... 320/12, 61, 5; 363/21, 63

[56] References Cited

U.S. PATENT DOCUMENTS

| | | | |
|---|---|---|---|
| 4,484,130 | 11/1984 | Lownes et al. | 320/40 |
| 5,099,186 | 3/1992 | Rippel et al. | 318/803 |

FOREIGN PATENT DOCUMENTS

| | | | |
|---|---|---|---|
| WO01127 | 12/1974 | European Pat. Off. | B60L 11/18 |
| WO9012744 | 4/1989 | European Pat. Off. | H01R 13/00 |
| 8004688 | 3/1980 | France | H02J 7/02 |
| 2645507 | 10/1976 | Germany | B60L 11/18 |
| 0125320 | 4/1983 | Germany | H02K 7/18 |
| 3410293 | 3/1984 | Germany | B60L 11/18 |

*Primary Examiner*—Adtya Krishnan
*Attorney, Agent, or Firm*—Watson Cole Stevens Davis, P.L.L.C.

[57] ABSTRACT

A charging system for a battery powered electric vehicle operates bidirectionally for charging the battery or for supplying power back to the utility grid at any selected power factor so that load leveling may be effected. A communications link between the utility and the charging system carries control signals and a control system associated with the charging system is responsive to the signals for controlling the charging rate and direction.

26 Claims, 14 Drawing Sheets

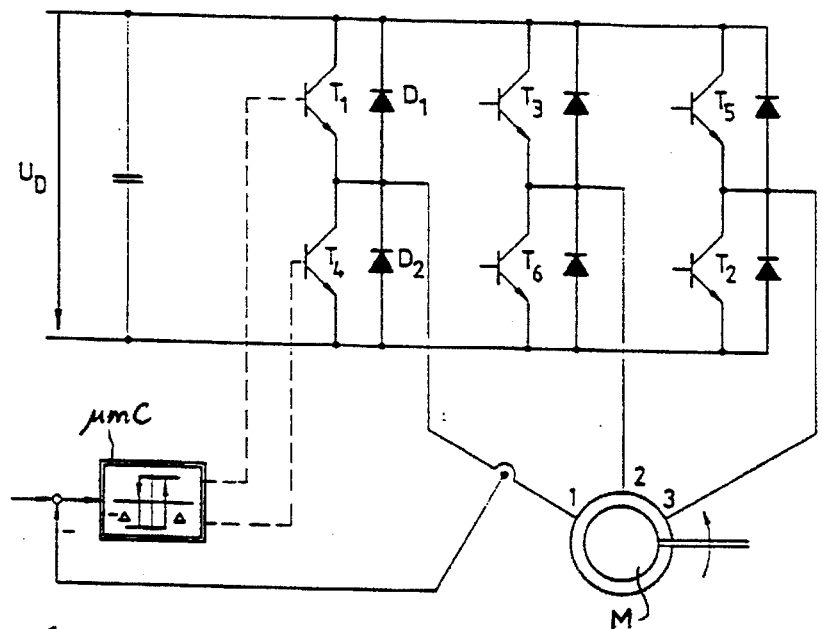
Figure 1
Figure 10
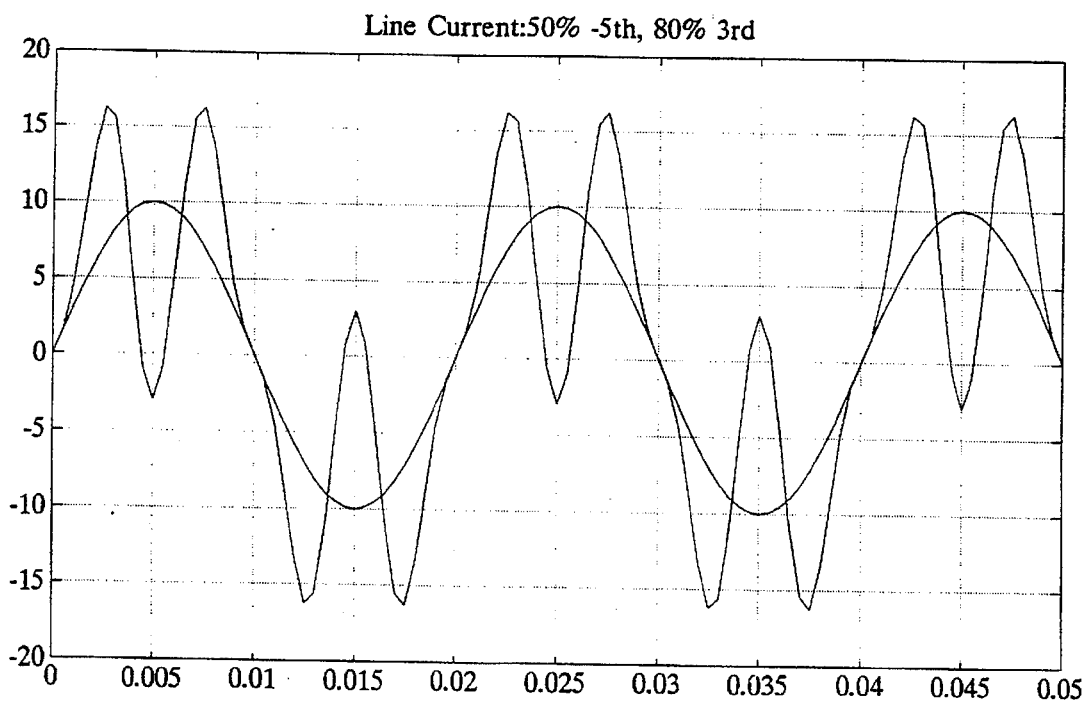

BATTERY POWERED ELECTRIC VEHICLE AND ELECTRICAL SUPPLY SYSTEM

The present invention relates to electric vehicles and, more particularly, to battery powered vehicles having power transfer systems, either integral or separate, capable of transferring power between utility supplies and the vehicles.

The present invention further relates to battery charging systems required for electric vehicles and so-called "electric-hybrid" vehicles of the type having a main electric drive and an auxiliary internal combustion engine (AICE) drive.

Environmental issues have heightened the interest in recent years in alternative means for providing personal and commercial transportation. Economic and regulatory issues have combined to promote the view that electric powered vehicles will, over the next ten years, appear in significant numbers. It is possible that the number of electric or electric-hybrid (EH) vehicles in key areas may be around 100,000 or more by the year 2000.

Aside from the known modest performance levels of electric and hybrid vehicles, a major issue is that of cost. Presently, EH vehicles with performance levels acceptable to personal users are expected to sell at considerably greater prices than functionally comparable conventional vehicles. Of particular importance here is the cost of the traction battery which is always much more expensive than a fuel tank. There are unlikely to be any compensating cost savings elsewhere within the vehicle, at least for the next few years. This means that a battery powered electric vehicle will always have a considerable purchase cost disadvantage in comparison with a conventional vehicle. The day to day running cost is dominated by the need to replace the battery every few years. Without this need, the running costs of an electric vehicle can be very low.

Electric vehicles of this type require charging of their batteries from time to time, most commonly overnight. The charging process can take from less than 1 hour to perhaps 10 hours or more depending on the initial state of charge and the charging rate possible. Electric utilities are keen to sponsor the use of large numbers of electric vehicles, primarily to increase their sales of electricity.

A major problem for utility electricity suppliers is the matching of supply to instantaneous demand. This involves a considerable amount of planning including estimates of TV audience patterns and weather forecasting. The load can also vary significantly due to unforeseen circumstances.

The utility companies attempt to ensure continuity of supply whilst minimising total cost of generation. Several means are used to do this. Firstly, a utility will prefer to keep its most economical generators running where possible, though these typically take longer to bring up to speed and are expensive to use at very low loads. In parallel with this it will keep some 'spinning' reserve available. This reserve consists of generators running at no or part load but synchronised with the grid. These can generate additional electricity very rapidly. The cost of maintaining such reserve is significant however. In addition to this, utilities maintain a number of other generators in a state where they can be started and brought into use in perhaps 1 to 30 minutes. In general the smaller systems can be brought on-line faster but generate electricity less economically than larger systems.

Other systems are in use, or being considered, including pumped storage systems which use surplus, low-cost electricity to pump water from a one reservoir to a second reservoir located physically higher. This procedure can then be reversed when additional power is needed. Battery storage is also becoming more attractive, including the use of high temperature batteries, though this requires additional rectification and inverter equipment to interface to the grid. The capital and running costs of this reserve capacity are high. Such techniques as are described above are generally known as "load levelling" techniques. Recently there has been increased interest in providing means for carrying out this function by giving utilities some control over consumers' load pattern, usually by allowing utilities to remotely turn off or reduce the power consumption of large power consuming loads. This technique is known as "demand side load-management".

According to a first aspect of the present invention, a charging system for a battery powered electric vehicle has means for passing electric power to or from its battery in either direction, to or from a utility (mains).

The charging system may be stationary, ie located at the normal point of charge, or else, preferably, may be integral with an on-board electric traction drive system. Preferably, in this latter case at least, the battery charging/supply system includes a number of semiconductor switches.

In order that the direction and amount of power being passed can be controlled locally or remotely by the electric utility company in such a way as to match the electricity supply and demand, either on a grid or a local basis, the vehicle charging system needs, preferably, to include either a timing means for arranging a connected charging system to supply the mains grid at appropriate times, or else includes a communication facility in order that the utility can send signals to vehicles to cause them to vary the power being taken during charging, or to reverse the power flow to supply the grid.

This system offers utility companies a potentially large rapid response reserve capacity without having to have spinning reserve and at little or no capital cost. This may make it attractive for them to subsidise electric vehicle batteries, thereby removing a barrier to the spread of electric vehicles and bringing forward the sales of electricity which they need for charging.

The invention thus also includes a mains/grid utility electric supply system having means for communicating with an electric vehicle, which is connected with the grid/mains supply for charging, to cause the vehicle to transfer electric power from the vehicle battery to the supply. Minor modifications from the basic charging system as described above are required, for example, to allow communications to be received, and optionally transmitted, to/from a local or remote command center controlled by the utility company, or others. Such a communication link may be based on signals superimposed on the utility supply or on a separate channel such as a cable or fiber-optic link which may additionally be used for billing purposes.

The charging system described above inherently has the capability to transfer power bidirectionally, that is from the utility supply to the vehicle battery or vice versa as it is required both to drive the vehicle (battery to motor) and to charge the battery regeneratively (motor to battery). The system is based on semiconductor technology. The selection of the direction and size of the power flow to/from the mains grid can be based on commands sent to the drive from the utility company. It is thus possible for the utility company to command electric vehicles, which are connected for charging, to supply or take varying amounts of power to/from the utility supply network. This can be done with both single and multi-phase lines. The amount and direction can be changed very rapidly. The utility company would have the ability to command connected electric vehicles singly, or in batches, to match total demand and supply on their network. An advantage of the present invention is that this balance can be both network wide and local, thereby minimising transmission losses.

A further preferable feature of the present invention—as for the operation of a delta charging strategy—is the use of an accurate state-of-charge estimator used to control the maximum charge and discharge states of the battery. In one possible implementation this estimator can easily be integrated into the charging control system at little additional cost.

A further advantage of the present system is that it can be controlled in such a way as to operate at different power factors and/or draw/supply controllable harmonic currents. These features are very beneficial to correct for other loads on a network which cause a utility company extra costs in the generation of reactive and/or harmonic power.

A further advantage of the present system is that it can be used to supply power to key installations, or to the local home, commercial or industrial location in the event of interruption to the main utility supply. In this event the charging system controllers could either be commanded to supply power using the communications link or could automatically detect the loss of the utility supply and initiate generation in response to this. In this mode of operation the charger would generate its own internal frequency reference and supply an AC voltage based on this. Where several electric vehicle chargers are used in this way driving a common network, some means of synchronisation is required. In the system to which the present invention relates the synchronisation would be carried out using the communication link or by using a master reference generator in each local group. Some means of preventing generation when there is a fault on the incoming line is needed, but this can be implemented by detecting voltage and current at the interface to the utility supply and terminating supply if there is a fault.

It is also necessary to consider the return of the utility supply, and the changeover that must take place when this occurs. It is likely that a practical system must have the synchronisation signal supplied by the utility company. If this is done it will be possible to break and restore the utility supply with little or no disturbance to consumers. This clearly needs a substantial infrastructure but is well within the bounds of existing technology for telephony and cable television and is within the scope of proposed integrated communication services to domestic, commercial and industrial properties.

The way in which this capability is used will clearly depend on the circumstances of the particular utility, network and number of electric vehicles available. However, it is likely that the usage will be along the following lines: When buying an electric vehicle customers will have a dedicated charging interface installed at the point where the vehicle is to be charged, typically overnight. Similar sites will be available for charging at other locations, such as shopping centers, offices etc. At each of these interfaces will be a power connection and a communications link. In exchange for some incentive, such as reduced pricing for the electricity used, the consumer will agree to the utility controlling the direction of power flow, subject to criteria including a minimum state of charge of the vehicle's batteries. For example, it may be appropriate to only use vehicles which have batteries at more than 75%, say, of full capacity. The electric vehicle driver can override this function, for example if a very fast charge is required for operational reasons, though this will lose the incentive for that charging cycle. Communication links to charging stations are already under discussion for remote billing based on an identification code stored in each electric vehicle. However, implementations can be envisaged where simple operation is possible without a communications link in place, whereby a connected vehicle is programmed to take or deliver set amounts of power at specific times. The programmed times can, for example, be adjusted when the electricity consumption of the vehicle is recorded by the supplying authority. In a strategy like this, the vehicle logs the exact electricity consumption and the consumer is billed regularly on an estimated basis which is confirmed by periodic readings directly from the vehicle.

The utility supplier will be capable of estimating the potential power available either from the knowledge that he already has about the typical electric vehicle charging patterns, or by direct signals from the electric vehicle along the communication link for billing purposes. The utility can then signal single, or more likely groups, of electric vehicles to control their power take off or supply from/to the utility network. By scheduling and responding to changing demands the electric vehicles will act as a flexible load levelling system which eliminates, or reduces, the need to have spinning reserve or to build dedicated load levelling systems, as is current practice.

Although the cost differential between conventional and electric vehicles is, in a major part, due to the cost of the batteries needed, it is also due to the many support systems needed in an electric vehicle. The support systems problem is even more severe in an EH vehicle.

Such support systems include the supply for vehicle ancillaries and the means for charging the traction motor battery or batteries.

For the first of these, means must be provided that deliver a power supply for float charging of a battery which supports an on-board low voltage electrical system. Although an electric or EH vehicle has substantial levels of accessible electrical energy, this is invariably at voltages incompatible with conventional vehicle components such as bulbs, switches, fuses, relays etc. The main electrical supply for traction purposes is invariably above the Safe Extra Low Voltage (SELV) limit of 42 V, and may be higher than 300 V, so that reticulation of traction voltages to specially rated vehicle ancillaries is dangerous as well as inconvenient and costly.

In conventional vehicles, support for the low voltage supply is provided by an alternator or generator—rated at several hundred Watts—driven by the internal combustion engine, together with regulating and control equipment. This method is expensive, and although it can be applied to electric and EH vehicles, it is typical with electric and EH vehicles to use a DC—DC converter to provide the low voltage supply directly from the main traction battery. Although the traction battery is conventionally made up of cell blocks, it is not possible to utilise one of these individually. Aside from the safety aspect, using one traction block, or a number of traction blocks, to support the low voltage supply causes unbalanced discharge and eventual battery damage. The DC—DC converter is also expensive, costing $200 to $400 or more, and adds weight.

Traction batteries in EH vehicles are recharged from the normal AC mains current using a charging system, but such conventional charging systems are very bulky, weighing many kilograms, and are (in the case of industrial electric vehicles) mounted off the vehicle, at the home location. For personal electric vehicles, it is common practice to carry the charger with the vehicle, so that charging can be carried out at destinations where there is a convenient AC supply. Such on-board chargers normally use high frequency switching technology to provide a charging unit of acceptable weight, in the tens of kilograms.

A second problem arises when energy flow rates are considered. A typical vehicle traction battery will be rated at (say) 20 kW-hr. A single-phase AC line can deliver energy at the rate of 2 to 3 kW, or more in some circumstances, so that full recharging is possible in around ten hours if perfect efficiency at unity power factor is achieved. In practice, the charge efficiency of the batteries may be as low as 80%, the energy efficiency of the charger may be 85%, and the charger may draw line currents with a power factor of 0.47 or lower. Consequently, charging in adequate time can be a problem, and energy costs can become unattractive with simple systems. Furthermore, the injection of harmonic currents to the AC network caused by simple charging systems may also raise both technical and legislative difficulties, particularly if very large numbers of chargers come into use.

Solutions to this second problem include provision of higher-rated single-phase lines, and utilisation of multiphase supplies. Although acceptable, availability of these supplies is not universal. Alternative technical approaches include using special charging systems that draw line currents at near-unity power factor, and the adoption of "delta" or charge/discharge methods that permit batteries to accept energy at higher rates, where an appropriate supply is available. Such approaches are expensive—with a high component cost—and add weight to the vehicle.

The traction system itself utilises well-known pulse-width modulation (PWM) inverter methods to synthesize a closely-controlled AC supply, from the DC traction battery. The controlled AC supply is used to drive conventional induction, permanent-magnet synchronous or other motors under variable speed and torque regimes to meet the demands of the vehicle user. Such systems are applicable from small ratings, up to ratings of many hundreds of kilowatts.

Inverters of this type are not new, and have been used in small numbers for industrial drive systems from the mid nineteen sixties. Early work in the field is described in Sch önung, A. and Stemmler, H.; "Static Frequency Changers with 'Subharmonic' Control in Conjunction with Reversible Variable-Speed AC Drives", Brown Boveri Review, Vol 51, p.555 (1964).

The major advantage of such systems is the brushless nature of the motor, which has markedly lower cost—and higher environmental tolerance—than the brushed DC motors normally used for controllable drives.

Since 1985, drive systems of the AC type have come into more general use. An industrial inverter drive normally operates by first converting the normal three phase or single phase line supply to an intermediate DC voltage, prior to "inverting" the DC back to AC with the desired parameters for driving the target motor. This intermediate rectification process complicates the drive, adding to cost, and has played a part in slowing the spread of AC inverter drives for industrial applications. An AC drive is, however, well suited to vehicle traction applications where the primary energy source is DC batteries. Vehicle applications of AC systems are still in the minority compared to conventional DC brushed traction systems, primarily due to the sophistication of the control systems necessary to achieve satisfactory operation with the AC system—and the costs of such systems when conventional methods are used.

In the system to which the present invention relates, the inverter is based on insulated-gate bipolar transistors, operating under the control of a microcomputer. Many other device technologies are also applicable, and other control methods aside from PWM can also be used. An example is the Load Commutated Inversion method, relying on natural commutation of the inverter devices, which is particularly applicable with permanent magnet machines.

The inverter has an energy efficiency of approximately 96% at full load, so that when 50 kW are being delivered to the traction motor or motors, 2 kW is dissipated in the inverter. At lower power levels, the losses are not as substantial. However, it is rare for the losses to be lower than 1 kW.

Most inverter drives inherently offer regenerative operation. Consequently, energy is recovered to the batteries when "engine braking" occurs, and this effect is exploited in the majority of personal electric and EH vehicle drives.

It is possible also to utilise the bidirectional energy flow capabilities of the system which is the subject of this invention in further ways.

According to a further aspect of the present invention, a traction drive system, for an electrically driven vehicle, includes an AC traction motor; a pulse width modulated (PWM) converter controllable to convert a DC electrical signal, fed from its battery to a first port, into an AC drive signal for the motor fed out from a second port; an AC input port; and switch means connected to the second converter port, for switching the second port between the traction motor and the AC input port, whereby the AC input port, on connection to a suitable AC source can be connected to the converter to charge the battery.

Preferably, the drive system comprises a traction battery of lead-acid or NaS type (although other types may be equally usable), plural DC link capacitors for sourcing and sinking high frequency current pulses that result from the operation of the power converter, a PWM converter consisting of six unidirectional self-commutating semiconductor switches with anti-parallel diodes (insulated gate bipolar transistors are preferable, but any suitably rated self-commutating switch can be utilised) the switches being arranged in a standard full-wave six-pulse bridge configuration, a microprocessor based controller one function of which is to generate six drive pulses to provide gating signals to the static switches, an electromechanical changeover switch consisting of two mechanically interlocked contactors which allow connection of the PWM converter to either the AC traction motor or the AC utility supply inlet port. The position of the changeover switch is controlled by the microprocessor, but an additional interlock feature will be included which inhibits changeover occurring whilst the vehicle or the traction motor is in motion. The traction motor may be of the synchronous, asynchronous or switched reluctance type.

The invention also includes apparatus for providing an auxiliary DC supply for vehicle equipment, from a symetrical multi-phase traction supply which employs a PWM controlled converter, the apparatus comprising means for offsetting a neutral point of the multi-phase supply by offsetting the PWM sequences for each inverter output pole.

One example of a grid system and a vehicle employing a traction drive and charging system in accordance with the present invention will now be described with reference to the accompanying drawings, in which:

FIGS. 1 to 6 are diagrams illustrating the principles of the invention;

FIG. 10 illustrates a line current waveshape associated with a charging regime of the type described in relation to FIG. 9;

Figure 7:
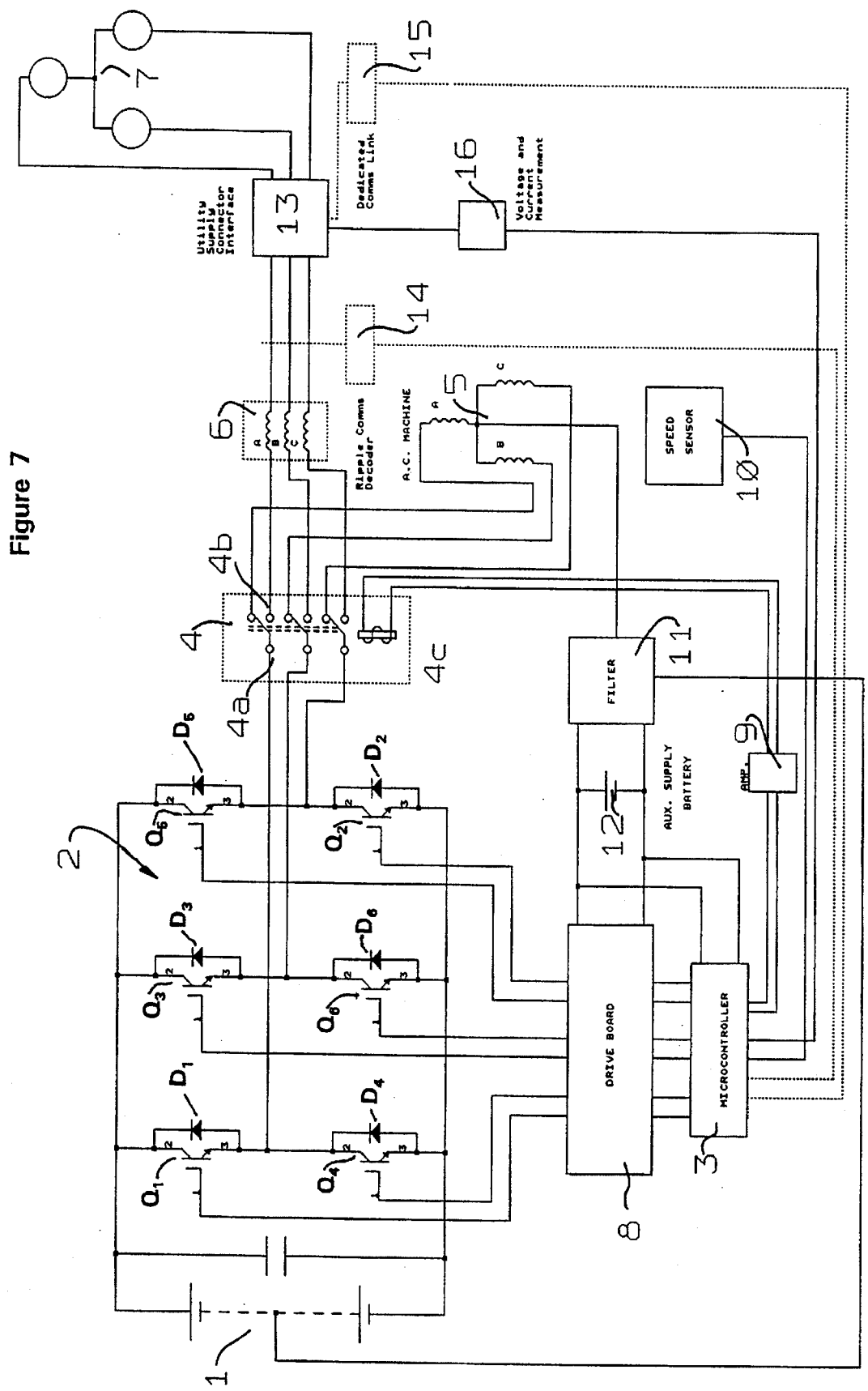
FIG. 7 is a basic circuit diagram illustrating an inverter drive system embodying the principles of the invention.
Figure 11A:
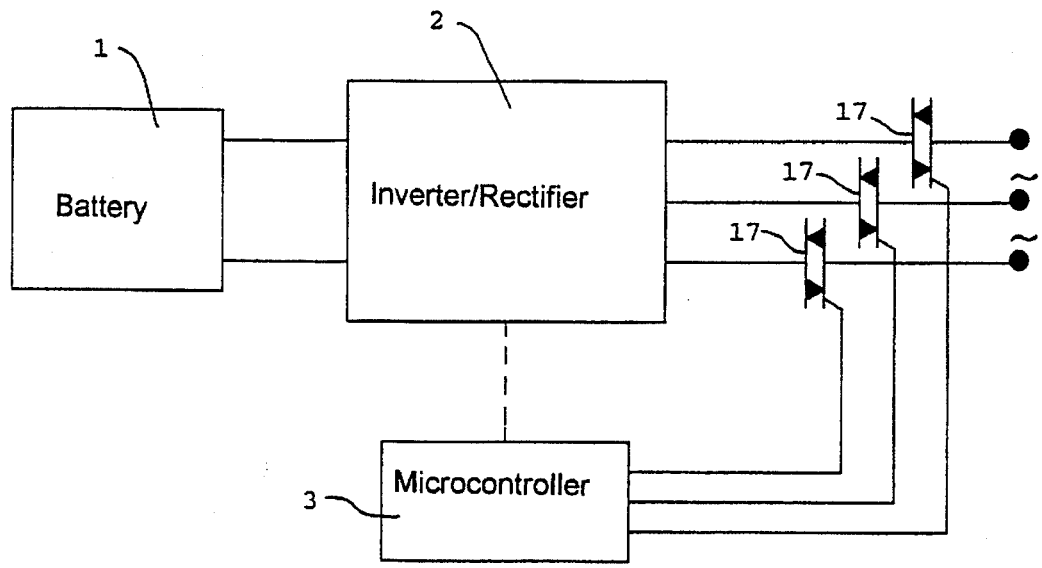
Figure 12:
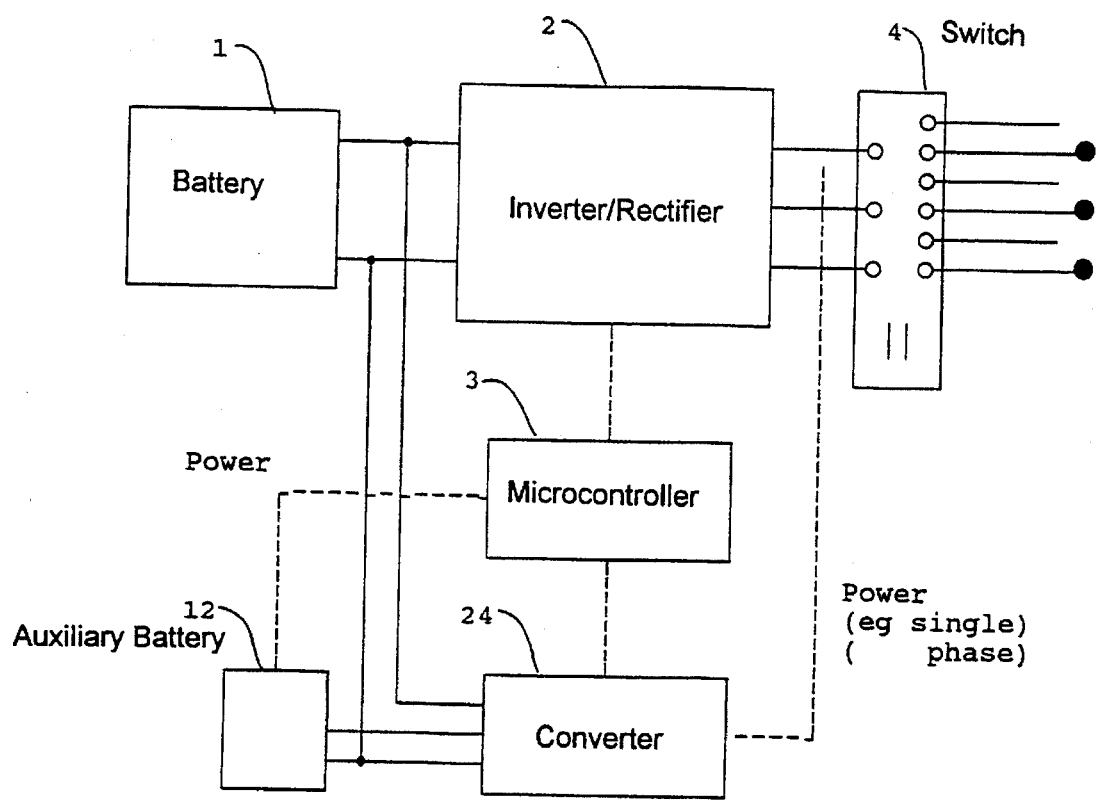
Figure 13:
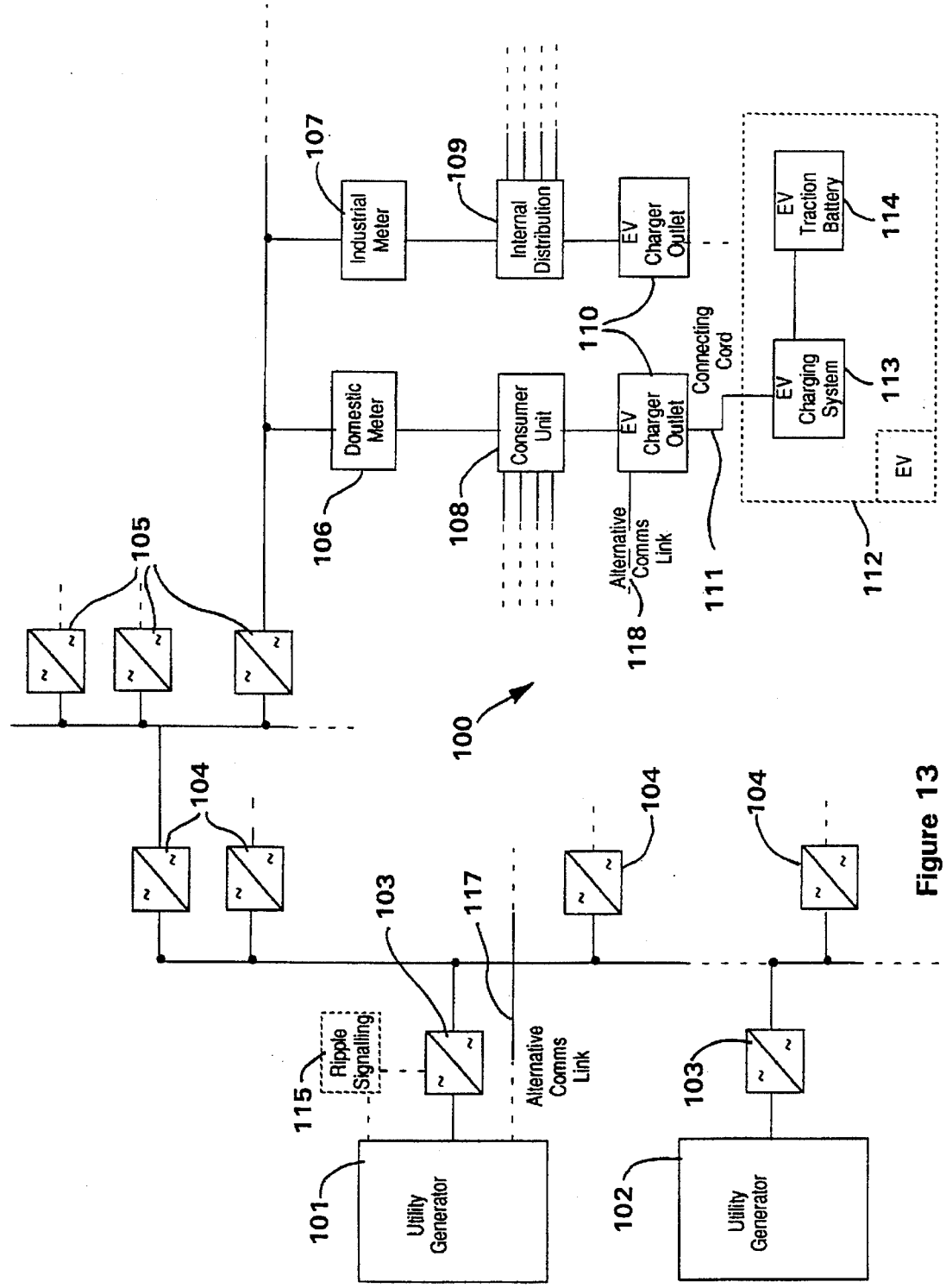
Figure 14:
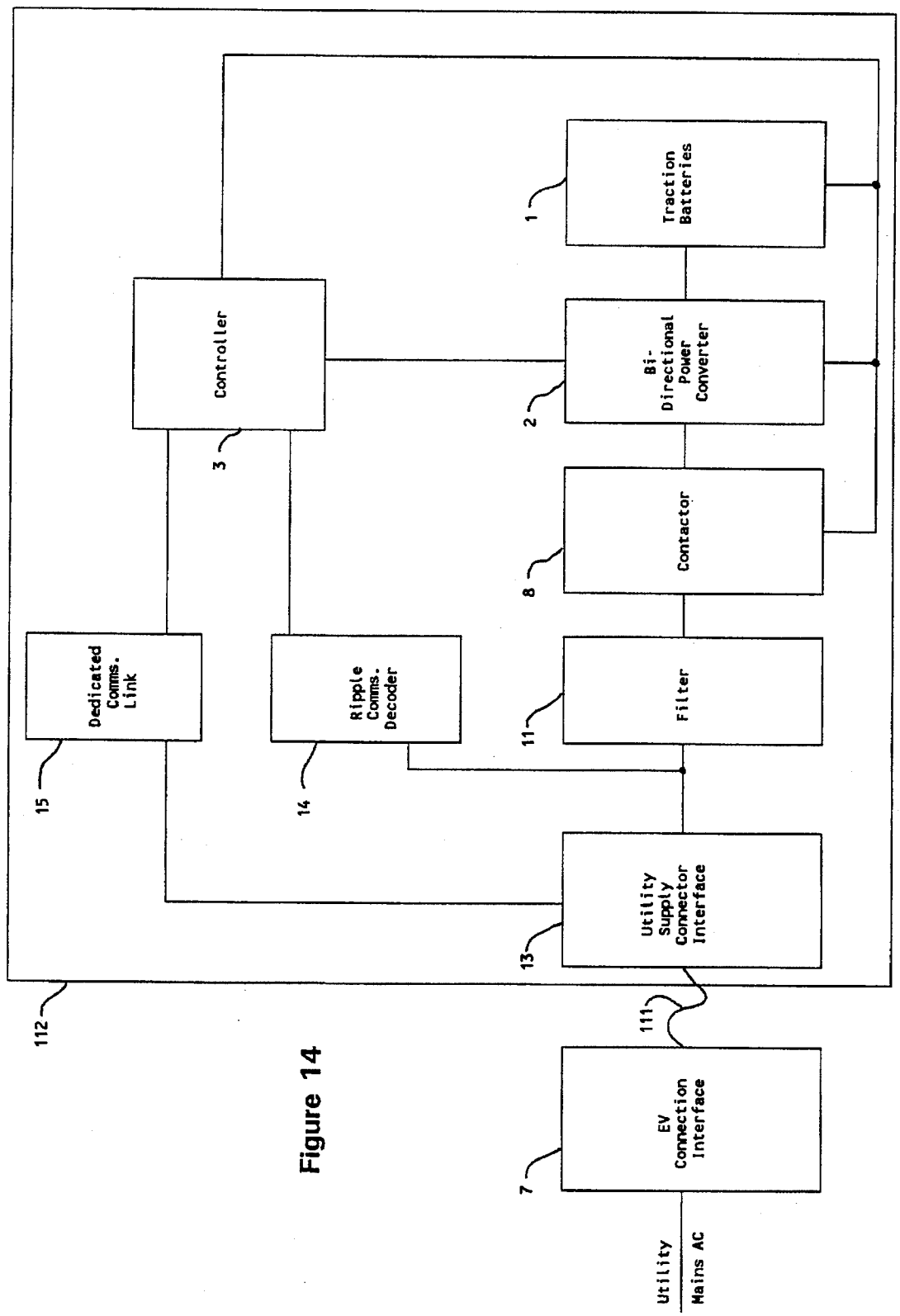
Figure 15A:
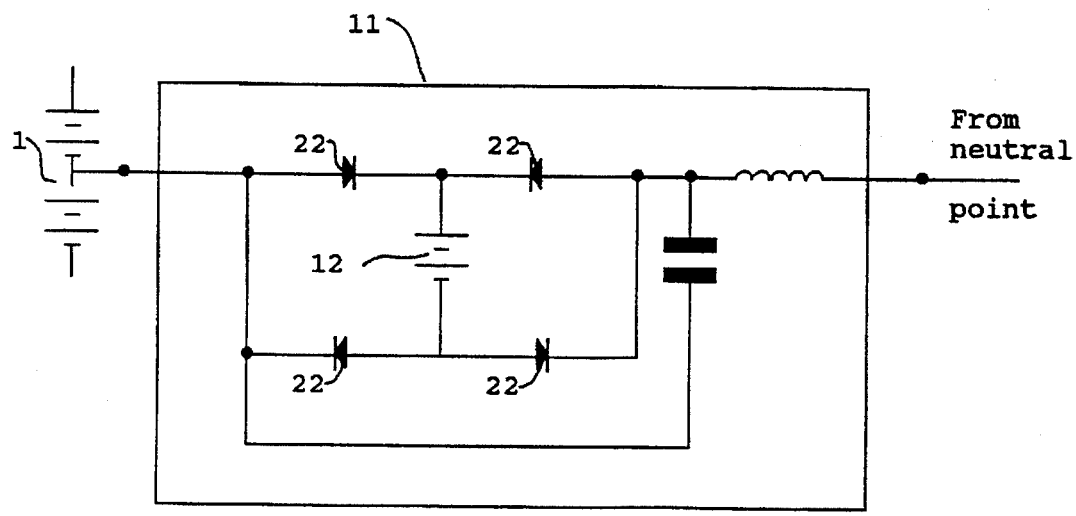

FIGS. 11A and B illustrate devices which may be used for handling low battery voltage conditions when recharging;

FIG. 12 illustrates the alternative use of an additional converter which may be used for handling low battery voltage conditions when re-charging;

FIG. 13 is a diagrammatic illustration of a grid/consumer system according to the invention;

FIG. 14 is a diagrammatic illustration of a vehicle charging/supply system; and, FIGS. 15A and B are diagrams illustrating details of filters which may employed in the circuit of FIG. 7.

The basic circuit elements for a three phase inverter drive are shown in FIG. 1. The basic inverter circuit comprises a pulse width modulated converter consisting of six self-commutating semiconductor switches $T_1$–$T_6$ with anti-parallel diodes $D_1$–$D_6$ arranged in a standard full-wave bridge configuration. The diodes $D_1$–$D_6$ are required where the switches $T_1$–$T_6$ are capable of unidirectional current conduction only. A microprocessor based controller μmC has the function of generating the six drive pulses necessary to provide gating signals to the switches $T_1$–$T_6$. The PWM converter thus converts a DC supply $U_D$ (usually a battery source) and supplies the resulting AC signals to an AC traction motor M. The traction motor M may be of the synchronous, asynchronous or switched reluctance type.

Substantially identical circuitry is sometimes used to give "regenerative rectifier" operation, interchanging power between an AC source and a DC source. A modification of this principle is utilised in the proposed vehicle drive, so that the traction inverter components are utilised—when the vehicle is stationary—as a regenerative rectifier.

Figure 2:
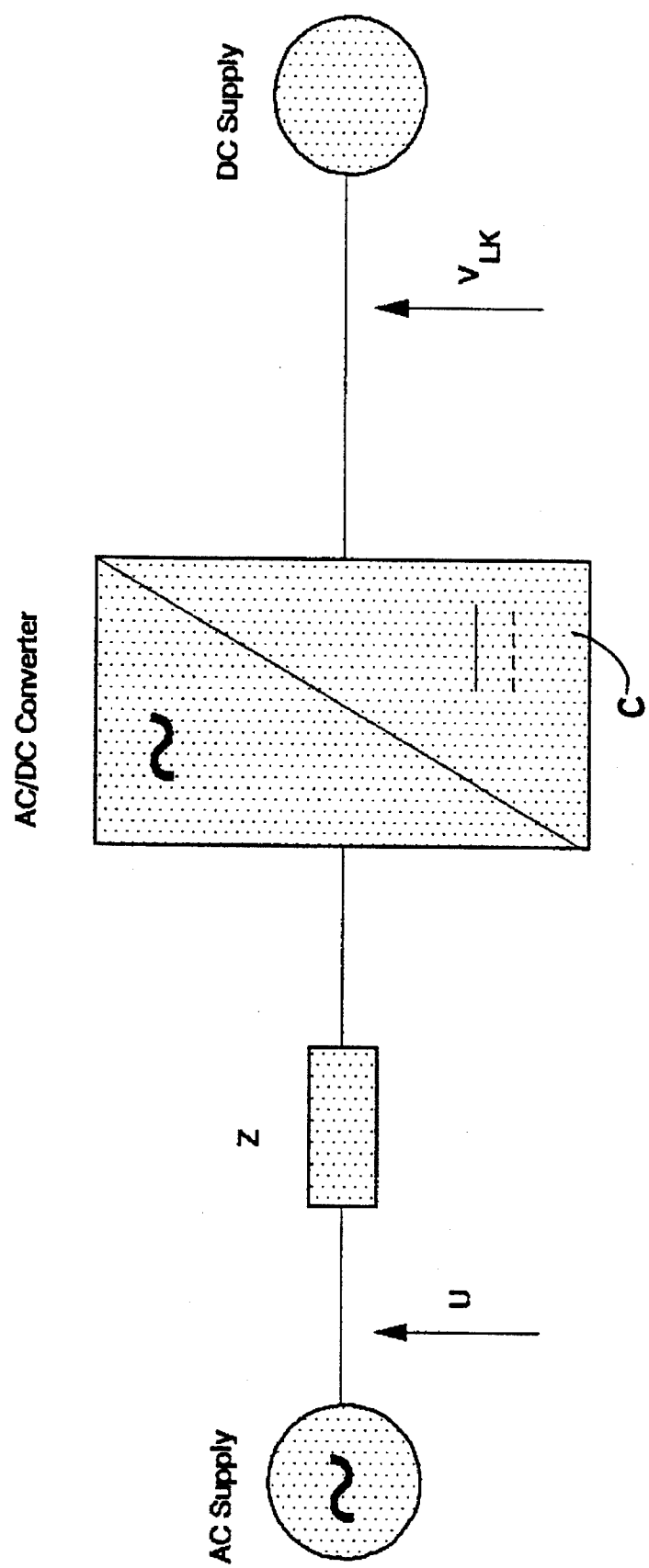
Figure 3:
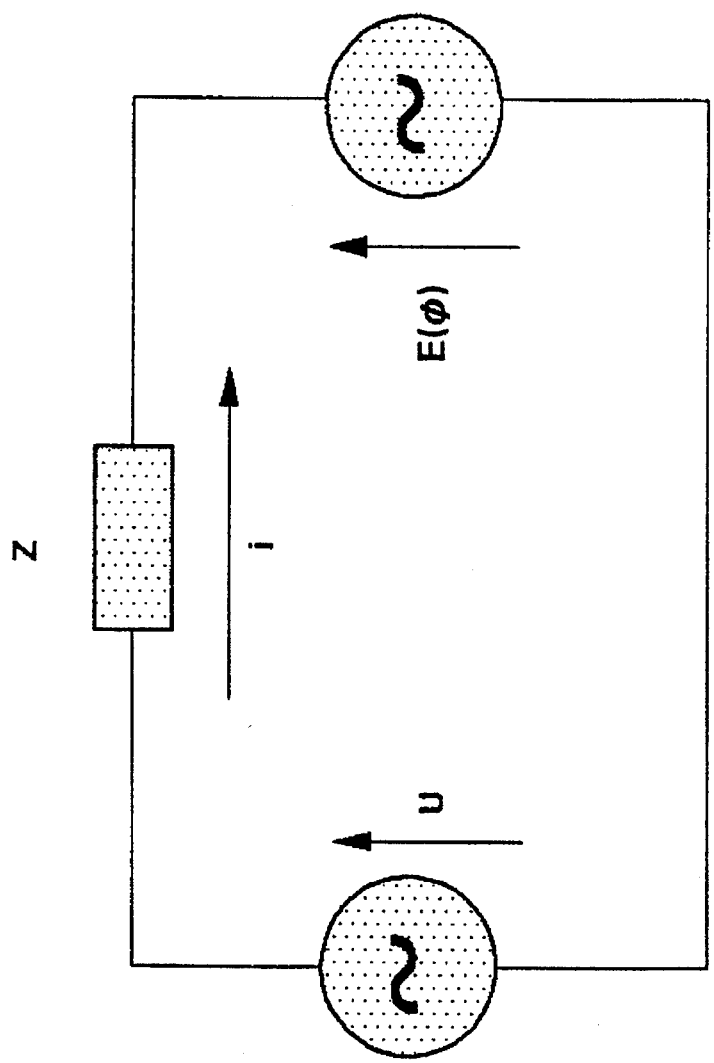

The operating principles are best illustrated in the single phase context. As illustrated diagrammatically by FIG. 2, an AC utility supply (or "mains") U is separated from an AC/DC converter C by a line impedance Z. The converter in turn is connected to a DC supply $V_{LK}$. Where the converter is sinusoidally PWM controlled, an AC source E is generated at its terminals derived from the DC supply. The system can then be represented as two independent AC sources separated by a line impedance Z (FIG. 3). The impedance Z is normally predominantly or wholly inductive in character.

Figure 4:
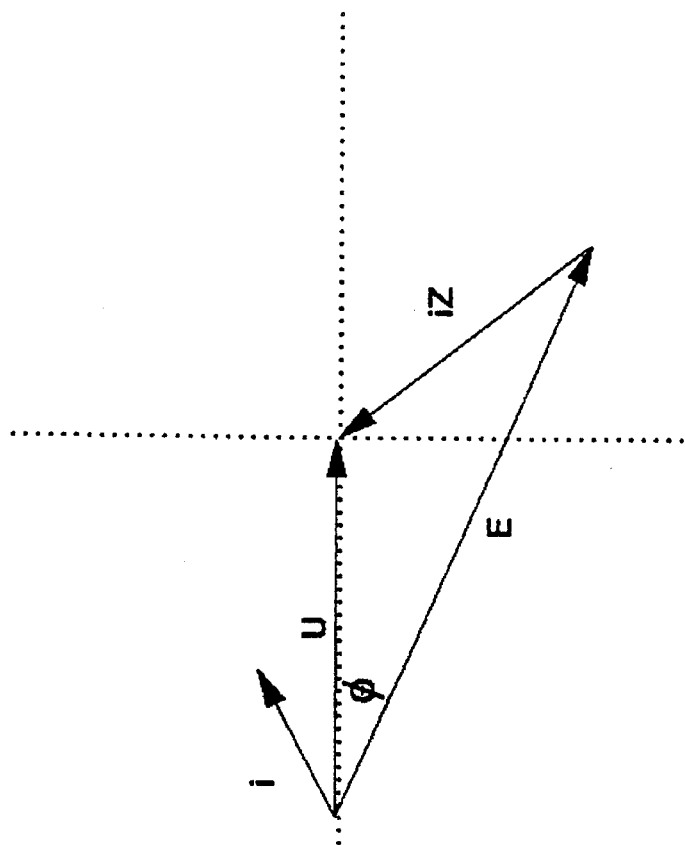
Figure 5:
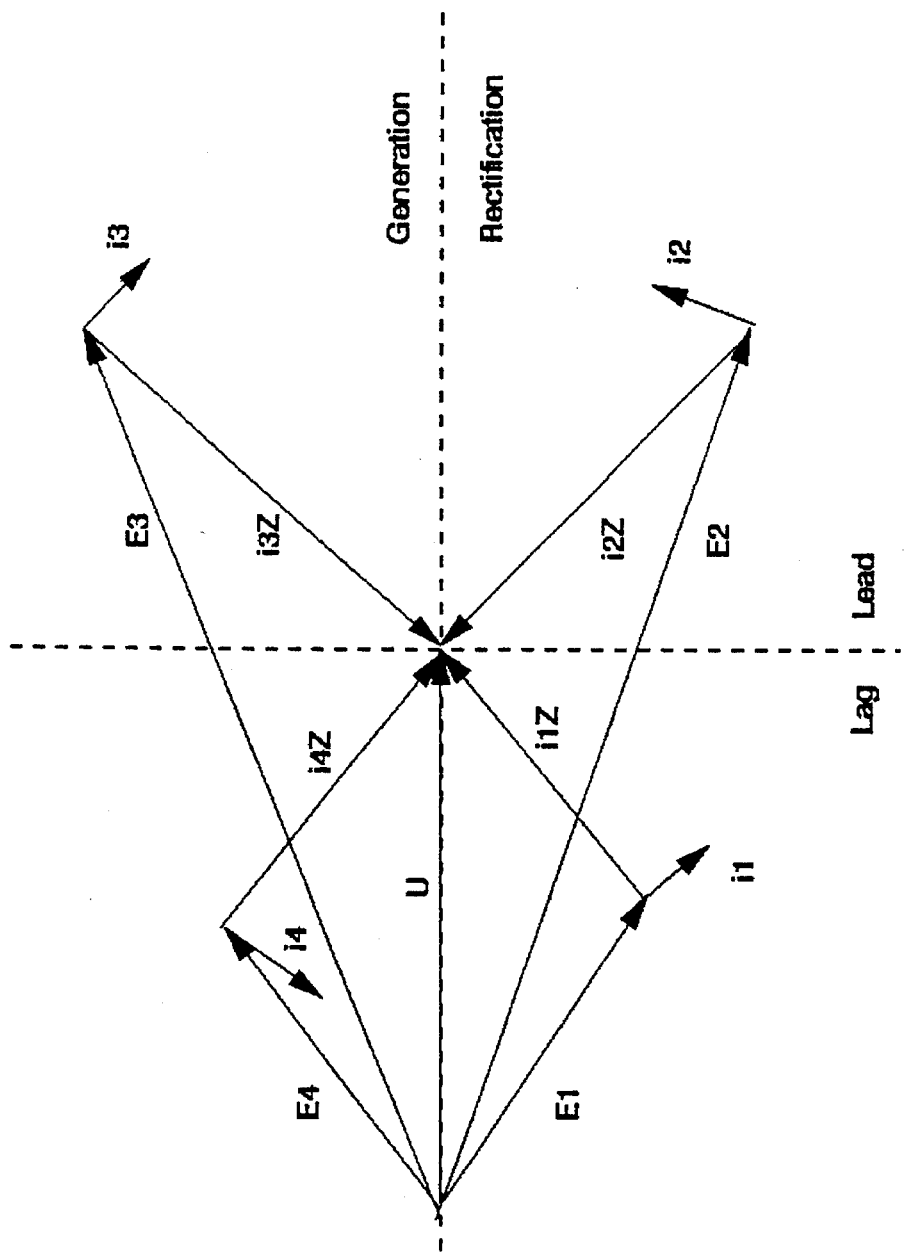
Figure 6:
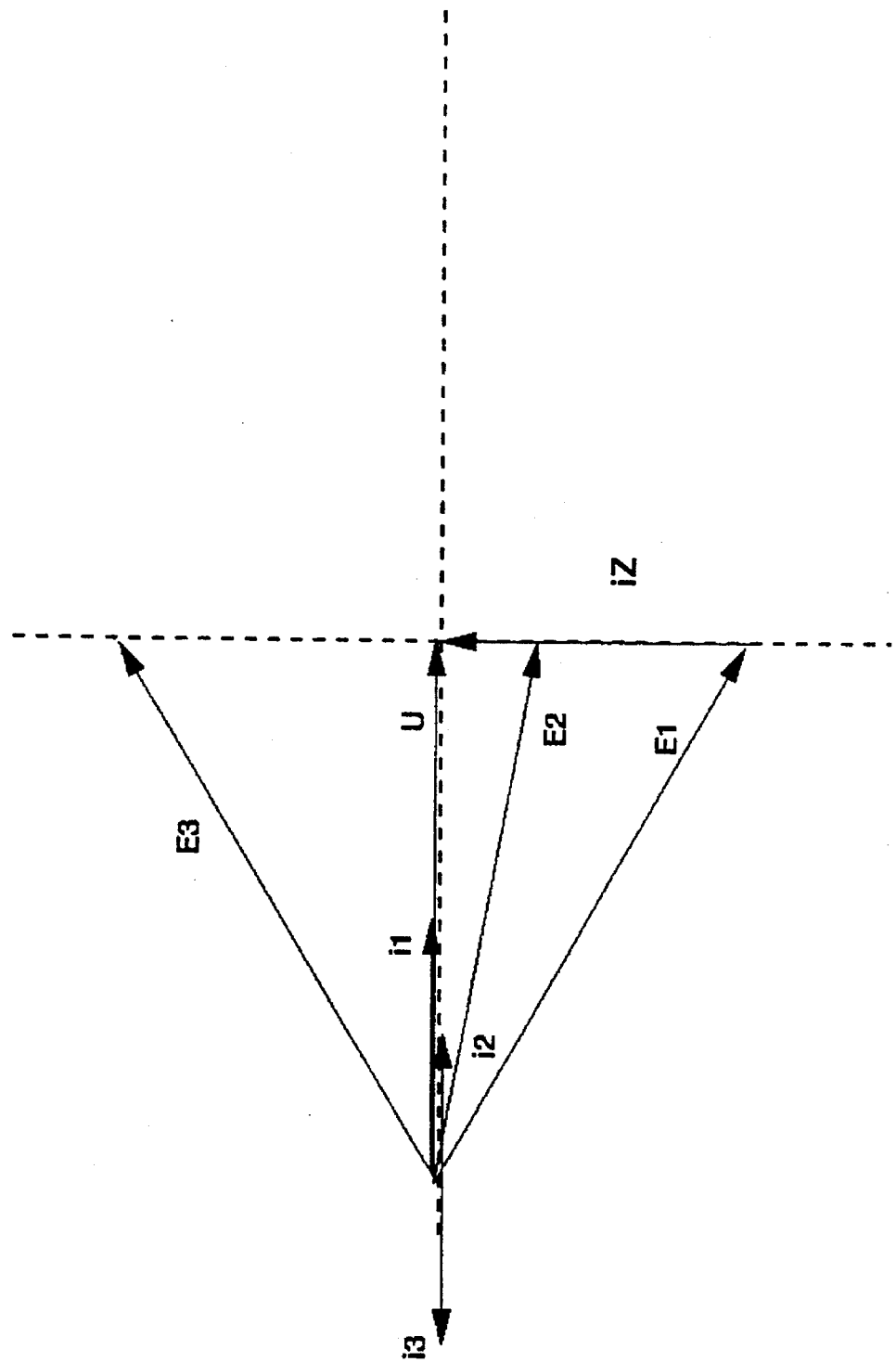

Taking the mains or utility voltage as a reference, the vectorial representation of the system is as in FIG. 4, and pwm control of the converter C enables variation of the phase and magnitude of the converter-generated AC voltage E with respect to the utility voltage U, as shown in FIG. 5. This control enables forcing of the current vector in the AC network, and it can be shown that the current vector may be forced to lead/lag or be in phase with the utility voltage. Unity power factor operation may be achieved in both rectification and regeneration. In the simplified case where the line impedance is wholly reactive, the locus of the voltage vector is in quadrature with the utility reference voltage U. This is illustrated by FIG. 6.

FIG. 7 illustrates the basic circuit diagram of one possible system according to the present invention. A battery 1 supplies a DC voltage to a PWM converter 2 which is in the form of six self-commutating semiconductor switches $Q_1$–$Q_6$ with anti-parallel diodes $D_1$–$D_6$ arranged in a standard full-wave bridge configuration. A microprocessor based controller 3 controls a drive board 8 which generates the required drive pulses necessary to provide gating signals to the switches $Q_1$–$Q_6$. The PWM converter thus converts the DC supply and supplies the resulting AC signals to the contacts on one side 4a of a solenoid operated multi-contactor switch 4. To the other side 4b of the switch 4 are connected the AC traction motor 5 (of the synchronous, asynchronous or switched reluctance type) and, through appropriate impedances 6, the terminals 7a,b,c of an input port 7, to which a mains supply may be connected when the vehicle is stationary.

In normal operation, the switch 4 connects the converter 2 to the motor 5, the microcontroller 3, through the drive board 8, controlling the converter switches $Q_1$–$Q_6$ as required to drive the motor. The microcontroller 3 also controls the solenoid 4c of the switch 4 through an amplifier 9 and is arranged to actuate the switch when called upon to do so by the operator so that a mains supply can be connected to the converter 2 through the input port 7 to charge the battery 1. The controller includes an interlock function such that the switch cannot be actuated when the vehicle is moving or the traction motor is operating. To this end a sensor 10 monitors the motor's speed and connects to the microcontroller to provide speed signals. In order to enable charging of the battery, the microcontroller actuates the converter switches $Q_1$–$Q_6$ as required to convert the AC mains signals to a DC voltage across the terminals of the battery, along the same lines as a "regenerative rectifier", as described in Destobbeleer, E. and Seguier, G.; "*Use of Pulse Width Modulated Techniques to Improve the Performances of Rectifiers*", Proc. 2nd European Conf. Power Electronics, Vol. 1, Grenoble, 22–24 September 1987, and briefly as outlined below.

This system thus has the advantage, for the addition of a small number of inexpensive components to the drive, of providing sophisticated charging compatible with many input sources—without a separate charging unit as such. Delta charging is also possible with this system, so that the batteries can be rapidly charged, and indeed discharged economically into the AC source if necessary to prevent memory effects.

A further advantage of the present system is that it minimizes the complexity of the physical infrastructure needed off the vehicle for charging purposes, thereby reducing the cost of providing facilities for charging electric and EH vehicles, particularly where high-rate charging services are needed. This will encourage the spread of power points suitable for charging, and hence increase the attractiveness of electric and/or EH vehicles to users.

While in most circumstances a utility mains supply at a frequency of 60 Hz, or a similar low frequency, will be used as the charging source, it is a further preferable feature of the invention that a wide range of source frequencies can be accepted, including DC and/or frequencies of several kilohertz. The upper frequency limit is principally determined by economic factors such as the cost of the switching devices $Q_1$–$Q_6$ shown in FIG. 7. However, with normal designs a source frequency in the region of three kilohertz can be accommodated, and ultrasonic frequencies in the region of thirty kilohertz are possible if switching devices optimized for speed are used in the system illustrated by FIG. 7. This aspect of the invention is important in situations wherein for legislative or other reasons a non-galvanic (eg inductive) coupling between the charging source is required. Where inductive coupling (say) is required, power is reticulated to the vehicles to be charged at a frequency of several kilohertz (and at the appropriate voltage level). In multivehicle charging stations this reticulation would advantageously be from a centrally mounted large converter, which transforms power from the normal low frequency source, to the frequency required for charging. To accommodate an inductive interface, the line impedance 6 in FIG. 7 is replaced by a two part transformer. The secondary winding of the transformer is carried as part of the vehicle and connected to the switch 4 shown in FIG. 7, while the mating primary of the transformer forms the utility connector interface 13 and is held as part of the stationary charging infrastructure. The high frequency of reticulation is important in reducing the physical size and weight of the the coupling transformer required.

A further important aspect of the invention is that "delta" charging regimes are easily implemented, wherein the batteries can be discharged into the connected utility network without dissipation of energy, as well as recharged. This procedure is important where very rapid charging (for example, at the ½ or ¼ hour rates) is needed, and involves using brief or sustained periods of discharge current to prevent electrode polarization effects. Electrode polarization occurs during charging through the finite time needed for ion migration from the electrode surfaces. Periods of discharge reduce these effects markedly, and permit the total time required to reach full charge to be significantly reduced, with lowered levels of battery self heating during charging. Discharging is also used for conditioning of new and partially aged batteries (for the avoidance, for example, of so-called "memory" effects). The operation of a delta charging regime is described with reference to the flowchart of FIG. 9.

Figure 9:
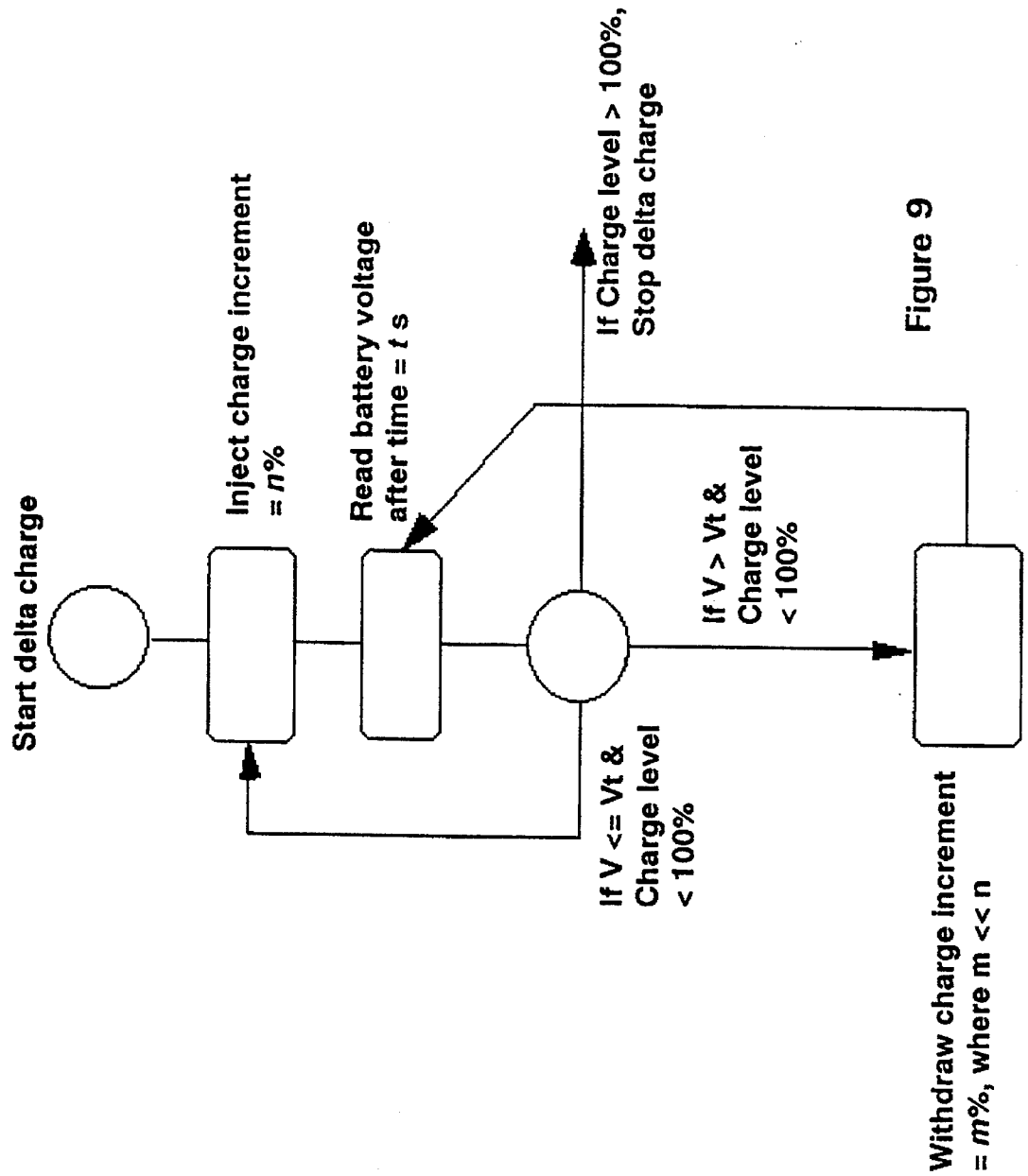
FIG. 9 is a flowchart which illustrates a charging regime which may be employed in a vehicle according to the invention.

According to the delta charging regime exemplified by FIG. 9, energy is delivered from the charging source to the batteries for a brief period (ranging from less than one second to several seconds or longer). Following this delivery period, energy is then withdrawn from the batteries for a period shorter than the delivery period, so that there is a nett energy flow from the charging source to the batteries. Resting periods, where energy is neither delivered or extracted, are also possible. Such strategies are well known for rapid charging of batteries. In the improved regime which is used as part of this invention, information regarding the battery state of charge is used to define the parameters (periods, energy delivery and extraction levels etc) of the delta charging regime. In this fashion, specific increments of charge can be added to, or extracted from, the batteries, with the increments being selected to be the most appropriate with regard to the prevailing battery state of charge. Instantaneous measurements of the battery terminal voltage, and measurements of other parameters, are also used to control the charging processes. For example, if during a charging period (where energy is being added to the batteries) the terminal voltage is observed to rise above a predefined level, charging is terminated, and a resting or discharging period is commenced.

The discharging abilities of the system described here can also be used in a variety of ways to correct line current conditions on the AC network which are non-ideal. For example, the preponderance of uncontrolled diode-capacitor rectifiers in electronic products that are in general use today cause a well known depression of the crest of the utility AC voltage waveform, such rectifiers only drawing current at, or near to, the crest of the utility waveform. This depression is reflected to the utility as a requirement to supply principally third, some fifth, and other harmonic currents, raising the costs of generation and transmission of electricity. The system which is the object of this invention can, however, be controlled to draw current of a preset form from the utility network. One such waveshape is shown in FIG. 10. Under this regime, the energy drawn from the network by the system described here is shifted from the crest of the waveform, and indeed energy is delivered back to the network for a brief period at the waveform crest. This strategy has the effect of supporting the network during the period where uncontrolled rectifiers are drawing current, and also offers a brief depolarization period to the batteries under charge. The principal drawback of such a scheme is the magnitude of the high frequency currents that are induced to flow within the batteries. The rectifier can be programmed if required to draw other waveshapes with different harmonic structures if desired, such programming also being possible by remote communications means if these are available.

Where the traction drive inverter is used as a regenerative rectifier in the manner suggested by this invention, additional means are required to limit source currents in the situation where the DC battery voltage level has fallen below the crest of the connected voltage source. While it is rare for the voltage of the traction batteries to fall below the source voltage crest, such events are observed and can reasonably be expected in vehicles which are (a) made available for use by the general public, (b) equipped with high voltage traction batteries which have voltages, in any case, with a normal value only slightly above the voltage of typical incoming sources, (c) equipped with high temperature batteries or (d) heavily discharged. Where the vehicle is left idle and not connected to a charging source for a period varying in length from a few days to perhaps several weeks, the charge level of the batteries will become slowly depleted, either from supporting on-board systems that require continuous power, and/or from battery self discharge effects. In the case of high temperature batteries, cooling of the battery will occur over this period. When such batteries reach the frozen state, the voltage level falls essentially to zero. In most high temperature battery management schemes, the battery energy is consumed to maintain battery temperature before the frozen state is reached, so that the frozen state will be coincident with a low level of charge. Consequently, a regenerative rectifier charging system is not practical for use in normal vehicles without additional means for handling the low battery voltage condition, and indeed unless special steps are taken to account for this condition, large surge currents will result from the closure of the switch 4 (see FIG. 7) to connect a vehicle in this state to the normal charging source, with possible battery damage, and protective systems such as fuses being called into play.

Such means could be implemented externally. For example, in the situation where (say) the vehicles are forklifts or material handling devices used within a constrained area such as a factory, technicians can bring special power converters and chargers to the discharged vehicle for purposes of providing an initial boost charge. However, for vehicles used by the public, it is less convenient for intervention by service technicians to be necessary, and the equipment should be provided on the vehicle itself so that charging can be carried out by the normal charging source, without any difference being visible to the user.

These means can be implemented in various ways; either in series with the regenerative rectifier on the source or battery sides, or in parallel with the main regenerative rectifier path. An additional converter (as described later) may be provided, in which case power for the additional converter is drawn from the source side of the switch 4 (FIG. 7). The series limiting means take the form of a variable impedance which may be variously implemented using resistors, inductors, controlled semiconductor devices, or other methods.

Figure 11B:
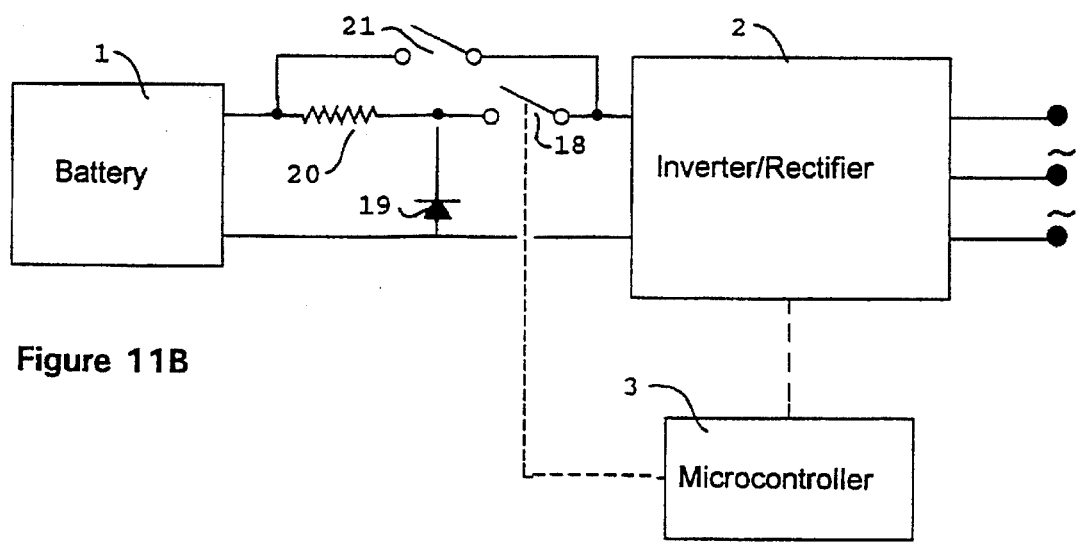

For example, triac devices may be inserted in series with each incoming AC source line. The triac devices 17 in FIG. 11A are controlled by the inverter/rectifier 2 and microcontroller 3, under the well-known phase-controlled regime, to reduce the effective AC input voltage—and therefore control the battery currents—during the period until the battery voltage rises above the crest voltage of the AC lines. Drawbacks of this system include the non-sinusoidal nature of the AC line currents during the period when the triacs are in operation. An alternative, illustrated in FIG. 11B, is the placement of a series element between the inverter DC output terminals and the battery. The element 18 may be inserted in either the positive pole, as shown, or the negative pole, as required. The series device may conveniently be an arrangement of IGBT devices, or similar semiconductor switches. The series device 18 is modulated by the inverter microcontroller according to a pulse width modulated or other regime, to reduce the inverter DC output voltage until the battery voltage rises as before. A parallel device 19 is provided for the control of currents flowing in inductances 20 on the DC side. A bypass switch 21 is used so that high rate charging is possible during normal operation of the system as a regenerative rectifier. This method has considerable advantages over the triac method. In particular, AC line currents of high quality are still drawn during the initial charging period, and the software required for the control of this series device is similar in many respects to the regenerative rectifier software used for the bulk of the charging period.

In some circumstances, it is preferable to provide an additional converter, placed in parallel with the main regenerative rectifier, to cover the situation in which the voltage of both the auxiliary and traction batteries is very low. The placement of the additional converter is illustrated by FIG. 12. This additional converter 24 is normally controlled by the main inverter microcontroller under a similar regime as described above, but is capable of limited operation on its own account. It is connected so as to charge both the main traction battery 1 and the auxiliary battery or batteries 12 (see FIG. 7 also). Such limited operation involves conversion of power at a low rate (say 200 W). The additional converter contains sufficient circuitry to provide this form of operation, which is invoked only by connecting it to a suitable charging source such as a single phase supply. Energy is then converted from the charging source by the additional converter until the voltage of the auxiliary battery rises sufficiently that operation of the main inverter microcontroller becomes possible. The main inverter microcontroller then modulates the additional converter according to a pulse width modulated or other regime, to improve the quality of the currents drawn from the charging source. Charging of the main traction battery is then possible via the additional converter at higher rates (say 1 kW) without undesirable levels of harmonic pollution being imposed on the connected charging source. With typical traction batteries it is necessary for 2% or more of full charge to be supplied before the open circuit voltage rises close to the normal levels. Consequently, at the 1 kW rate, it is necessary to operate the additional converter for approximately 30 minutes before the traction battery voltage rises to the levels where normal charging, via the regenerative rectifier, can commence. Such operation is also compatible with the reheating requirements of high temperature batteries, such as sodium sulphur or sodium nickel chloride batteries for example, which must be heated to the molten state before charging can commence.

In this way, it is possible to re-energize a vehicle which has become completely "dead" (even to the extent that the main inverter microcontroller has ceased operation), merely by connection of the normal, or another suitable, charging source. Such operation occurs completely without intervention from the vehicle user—although the longer charging time will be apparent to the user—which is important for vehicles which are to be operated by the general public. Provided the equipment described here is provided on the vehicle, it is unnecessary for any technician or service organization to be involved. The user can reenergize a deeply discharged vehicle in the normal way.

Drawbacks include the extra cost of the additional converter, although in practice this cost is minimised if the major control functions are delegated to the microcontroller already used for controlling the inverter/regenerative rectifier.

The operation of the vehicle traction drive system shown in FIG. 14 of the drawings is generally as described above, but the system will now be further described in relation to FIG. 13, specifically in relation to the use of the vehicle charging system in reverse, to supply power from the vehicle battery to the utility grid or mains.

The particular arrangement of consumer units, meters, communication facilities will depend upon individual utility requirements, as will the control software and communications link(s) to enable operation.

In particular, alternatives of a dedicated communications link or a ripple signal decoder are illustrated. In other respects, the charging system is as described above.

FIG. 13 is a simplified diagram of the grid (mains utility) system and associated vehicle components. The diagram shows plural utility generators 101, 102 normally supplying electrical power to a grid, generally indicated at 100, through conventional transformers 103 which step up the voltage as normal for transmission. Further transformers 104, 105 step the voltage down to local and then domestic and industrial user levels and the supply is fed to individual meters 106, 107 and then distributed through conventional domestic or industrial consumer units 108, 109. One dedicated outlet is an EV charging outlet 110 which can be connected through a power cord 111 to an electric vehicle 112, the components of which are generally as described above, but include a charging system 113 and traction battery 114.

A ripple signalling unit 115, located at the utility generator can be used to provide signals to corresponding vehicle units 14 to cause connected vehicles to re-supply the grid as desired, but, alternative communications systems such as radio, cable, fiber-optic may be utilised. These links are indicated schematically at 117, 118 and the vehicle-end units for receiving the signals are indicated at 15 (see FIG. 7).

In actual operation of the system to supply the grid or mains from a given vehicle, in the vehicle the switch 4 (see FIG. 7) connects the converter 2 to the utility supply through an impedance 6 as for charging. The operation is substantially the same as for charging, in that the converter-generated voltage is controlled to have a desired vectorial relationship with the utility grid/network voltage. In other words, both real and reactive components which result when voltages and currents are not in phase may be controlled. In the case where power is supplied to the grid or mains, this relationship is different from the charging case in that the converter-generated voltage is controlled so that power is forced to flow from the battery through the converter into the utility network. The vectorial relationship depends on the requirements for power level, power factor, and harmonic content. In one implementation of the present system, this requirement is transmitted, along either a dedicated communication link 15 or alternatively a ripple communication system 14, from the utility company or other authorised control authority.

In the context of the type of vehicle to which the present invention primarily relates, where a star connected three phase traction motor is being used, there is a straightforward method for providing a 12 V supply—or indeed any other appropriate voltage that may be desired.

Figure 8:
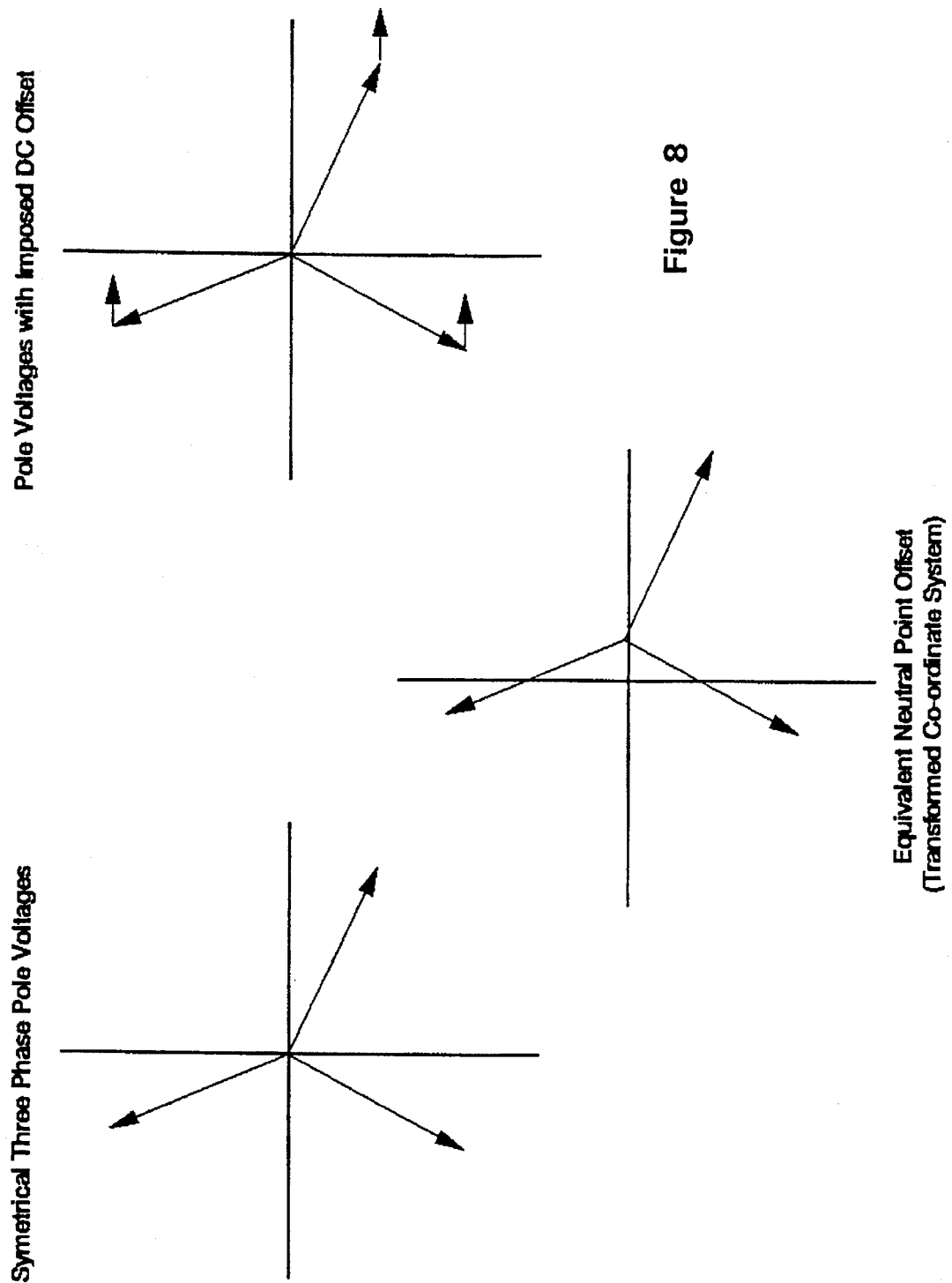
FIG. 8 illustrates the vectorial relationship of the converter pole voltages, leading to a neutral point offset, according to the second aspect of the invention.

The method used in this invention is to offset each motor pole voltage by a constant amount, as illustrated by FIG. 8. In a symmetrical multiphase system, such offsets which are vectorially concurrent have no nett effect on the individual phases. Such concurrent disturbances cause the neutral point of a symetrical multiphase system to be displaced. The effect is commonly observed in multiphase, inverter-fed systems as voltage oscillation of the neutral point, relative to the ground terminal of the DC supply, particularly where an asymetrical offset occurs per phase.

In the inverter of the present system, as illustrated by FIG. 7, an offset is applied by the microcontroller 3 to the PWM sequences generated for each inverter output pole. The offset is such that the the output PWM sequences contain a DC component which—when time-averaged by the filtering effect of the motor windings and an additional filter 11—equates to a neutral point offset voltage of nominally 14 V. The neutral point of a star-connected motor is directly accessible and can be used (with appropriate protection circuitry) for charging an auxiliary 12 V battery 12. Feedback via the traction drive microcontroller 3 is used to regulate the offset voltage, controlling the auxiliary battery charging processes.

FIG. 8 illustrates the vectorial relationship of the pole voltages, leading to the neutral point offset.

Several operational points are important for the practical utilisation of this neutral point offset technique. In particular, a periodic reversal of the offset, with respect to the centerpoint of the traction battery, is required so that a balanced discharge of both halves of the traction battery is achieved. Diodes 22 as shown in FIG. 15A can be added to the filtering circuitry 11 of FIG. 7 so that unidirectional current flow through the auxiliary battery 12 is maintained in these circumstances. Furthermore, precise control of the pole to pole switching periods of the pulse width modulated inverter is required, with the desired pulse period differentials required for the creation of the neutral point voltage offset being maintained through the power stage to the motor terminals. In practice, the energy delivered to the auxiliary battery from the main traction battery via the inverter power stage is in short pulses, so that the effects of source impedance are important. Furthermore, the traction motor must be rated to withstand the additional winding losses that result from the extra currents that flow as a consequence of this neutral point offset technique. In practice, this loss increase is of the order of 1% of the rated machine power, depending on the level of low voltage power delivery, the specific characteristics of the machine, and other factors, so that in typical circumstances no change to the machine design is required.

Where delta-connected motors are used, the neutral point is not directly accessible. An artificial neutral for charging purposes can be conveniently created by a number of star-connected reactive impedances. The impedances need only be rated to carry the anticipated auxiliary battery charging currents.

Figure 15B:
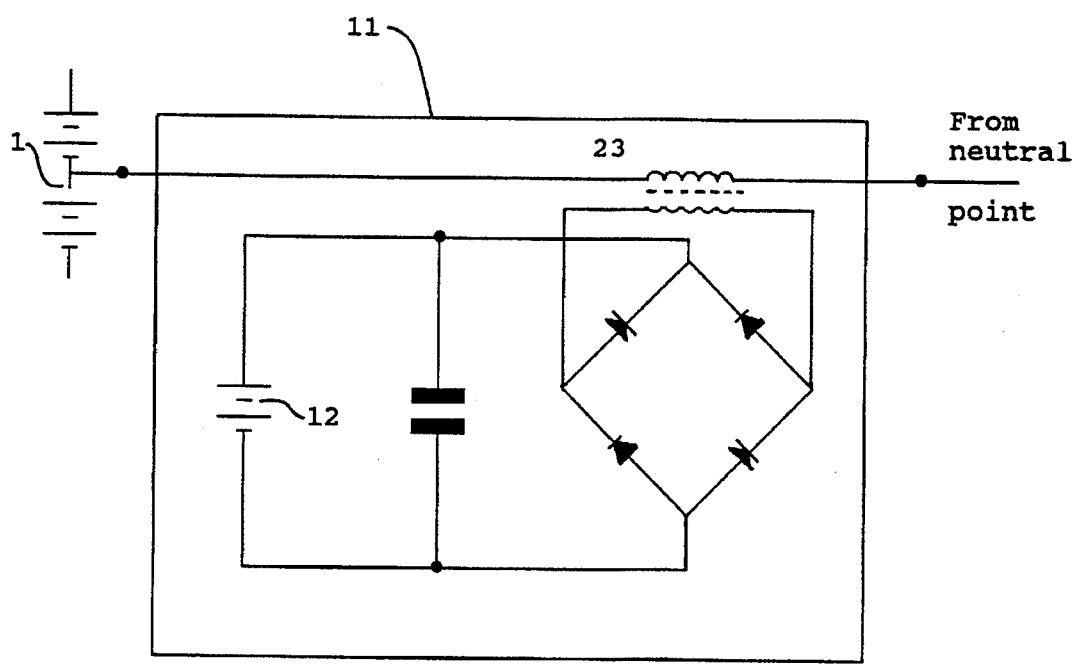

In some systems, it is possible to modulate the pole offset at a high frequency of several hundred Hertz, so that the charging source derived from the neutral point offset can itself be passed through a small high frequency transformer 23 (see FIG. 15B) to provide isolation if required. A drawback of this secondary-isolated system in motor drives intended for wide speed ranges is that the effective carrier frequency available to support the neutral point oscillation becomes low at high motor speeds, as the number and time duration of the PWM pulses used to form each cycle of the basal motor frequency becomes reduced. The isolation tranformer must therefore be designed to support the lowest frequency encountered over the full range of inverter operation, which has the effect of increasing the transformer size and weight. The transformer positioning is illustrated by FIG. 15B. In most systems, however, the effective frequency does not drop below 100 Hz, and problems do not therefore arise.

Alternatively, the offset can be temporarily removed if the effective frequency falls below a set point. This means that charging the auxiliary battery will not occur during periods of high speed vehicle operation, but that a high frequency isolation transformer is still usable. This is unlikely to be a disadvantage for these vehicles, and if necessary (if charging is essential) the offset can be restored by introducing additional PWM pulses, at the expense of underfluxing the traction motor slightly.

We claim:

1. In a battery powered electric vehicle, a system for controlling power transfer with a power distribution network for charging and discharging the battery when connected thereto comprising:

power transfer means for passing electric power bi-directionally between the battery and the power distribution network;

communication means operatively coupled between the power distribution network and the power transfer means for providing control signals indicative of at least one of a selected power factor, power level and harmonics content to the power transfer means in accordance with the supply and demand on said power distribution network; and control means responsive to the control signals and operatively coupled to the power transfer means for controlling the power passing between the battery and the power distribution network.

2. A system according to claim 1, which is integral with an on-board vehicle electric traction drive system.

3. A system according to claim 1, wherein the battery charging/supply system includes a number of semiconductor switches.

4. A system according to claim 1 including a timing means for controlling power transfer at selected times.

5. A vehicle according to claim 1, further including a state-of-charge estimator to control the maximum charge and discharge states of the battery.

6. A system according to claim 1 wherein the communication means comprises a channel separate from the power distribution network.

7. A system according to claim 1 wherein the communication means includes power lines of the power distribution network for carrying the control signals superimposed thereon.

8. A system according to claim 1 including an AC traction motor; a pulse width modulated (PWM) converter having first and second ports controllable to convert a DC electrical signal, fed from the battery to the first port, into an AC drive signal for the motor fed out from the second port; an AC input port; and switch means connected to the second port, for switching the second port between the traction motor and AC input port, whereby the AC input port, on connection to an AC source can be connected to the converter to charge the battery.

9. A system according to claim 8, which further comprises plural DC link capacitors for sourcing and sinking high frequency current pulses that result from the operation of the power converter, the PWM converter including an unidirectional self-commutating semiconductor switches ($Q_1$–$Q_6$) with anti-parallel diodes ($D_1$–$D_6$), the switches being arranged in a full-wave bridge configuration.

10. A drive system according to claim 9, including a microprocessor based controller for generating drive pulses to provide gating signals to the switches ($Q_1$–$Q_6$).

11. A system according to claim 8, including an electromechanical changeover switch comprising a pair of mechanically interlocked contactors which allow connection of the PWM converter to either the AC traction motor or the AC utility supply inlet port.

12. A system according to claim 11, wherein the position of the changeover switch is controlled by the microprocessor.

13. A system according to claim 8, including an interlock for inhibiting changeover occurring while the vehicle or the traction motor is in motion.

14. A system according to claim 8, wherein the battery is of lead-acid, sodium sulphur, sodium nickel chloride or other type suitable for vehicle traction.

15. A system according to claim 8, including apparatus for providing an auxiliary DC voltage supply for vehicle equipment, from the PWM controlled converter, including means for offsetting a neutral point of a multi-phase supply by offsetting the PWM sequences for each inverter output pole.

16. A system according to claim 8, including means for enabling the battery to be charged through the PWM converter.

17. A system according to claim 16, wherein said means comprises a switching device positioned in series between at least one of the battery and the converter and between the converter and the charging AC supply.

18. A system according to claim 16, wherein an auxiliary converter is provided, in parallel with the main converter, to enable charging of the battery independently of the main converter.

19. A system for controlling power transfer between a battery powered electric vehicle and a power distribution network comprising:

power transfer means for passing electric power bi-directionally between the battery and the power distribution network for charging and discharging the battery;

communication means operatively coupled between the power distribution network and the power transfer means for providing control signals of a selected vectorial relationship to the power transfer means in accordance with supply and demand on said power distribution network said vectorial relationship including at least one of a power level, power factor and harmonic content; and control means responsive to the control signals operatively coupled to the power transfer means for controlling the power passing between the battery and the power distribution network in accordance with said vectorial relationship.

20. A system according to claim 7 wherein the communication means includes at least one of a radio, cable and fiberoptic link.

21. A system according to claim 20 wherein the communication means includes billing means.

22. A system according to claim 19 wherein the communication means includes a ripple generator.

23. A system according to claim 1 wherein the power transfer means includes a three phase circuit.

24. A system according to claim 1 wherein a plurality of said battery powered vehicles, each having a charging system and batteries at various charging states are coupled to the power distribution network and the control signals are selected for each vehicle such that the plurality of charging systems cooperate to provide load leveling of the power distribution network.

25. A charging system for controlling power transfer between a battery powered electric vehicle and a utility power grid subject to supply and demand comprising:

circuit means on the vehicle for passing electric power between the battery and the power distribution network;

communication means operatively associated with the power grid for providing control signals to the circuit means in accordance with the supply and demand on said power distribution network; and control means responsive to the control signals and operatively coupled to the power transfer means for controlling at least one of a power factor, power level and harmonics content of the power passing between the battery and the power distribution network.

26. A system for charging a battery representing a sensible load from energy supplied by a power grid and for discharging the battery to supply energy back to the grid comprising:

circuit means for bi-directionally passing power between the battery and the grid in accordance with supply and demand on said grid;

control means operatively coupled to the circuit means for controlling charging and discharging of the battery in accordance with control signals selectively representing real and reactive components of the power to be transferred; and communication means between the power grid and the control means for carrying said control signals to said control means.

* * * * *